Dec. 8, 1964  H. E. POLLITT  3,160,330
DISPENSER
Filed March 26, 1963  2 Sheets-Sheet 1
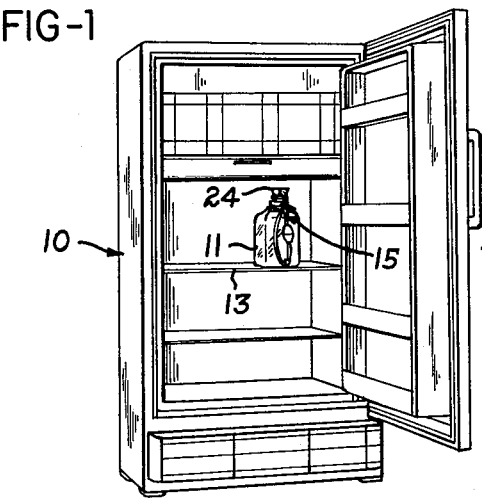
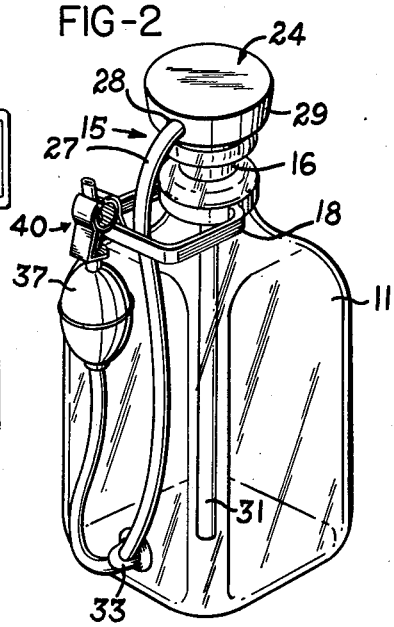
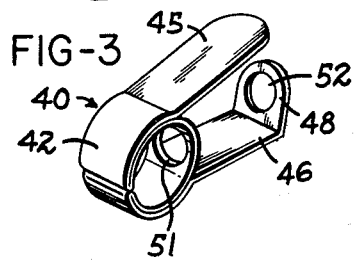
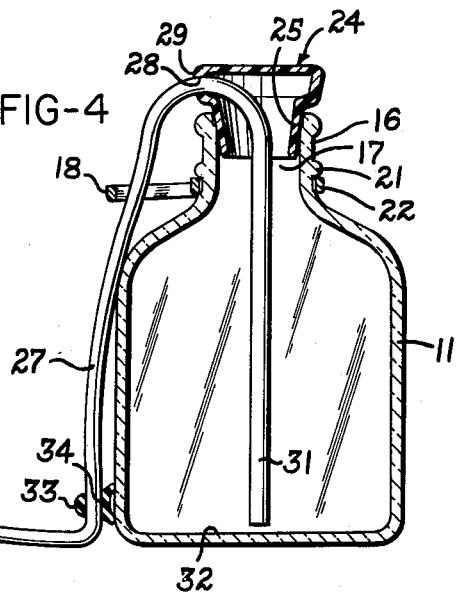
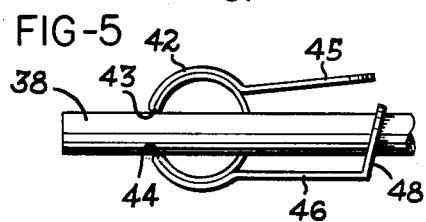
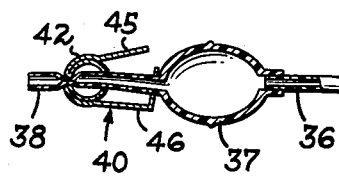
INVENTOR.
HAROLD E. POLLITT
BY
Marechal, Biebel, French & Bugg
ATTORNEYS Dec. 8, 1964  H. E. POLLITT  3,160,330
DISPENSER
Filed March 26, 1963  2 Sheets-Sheet 2
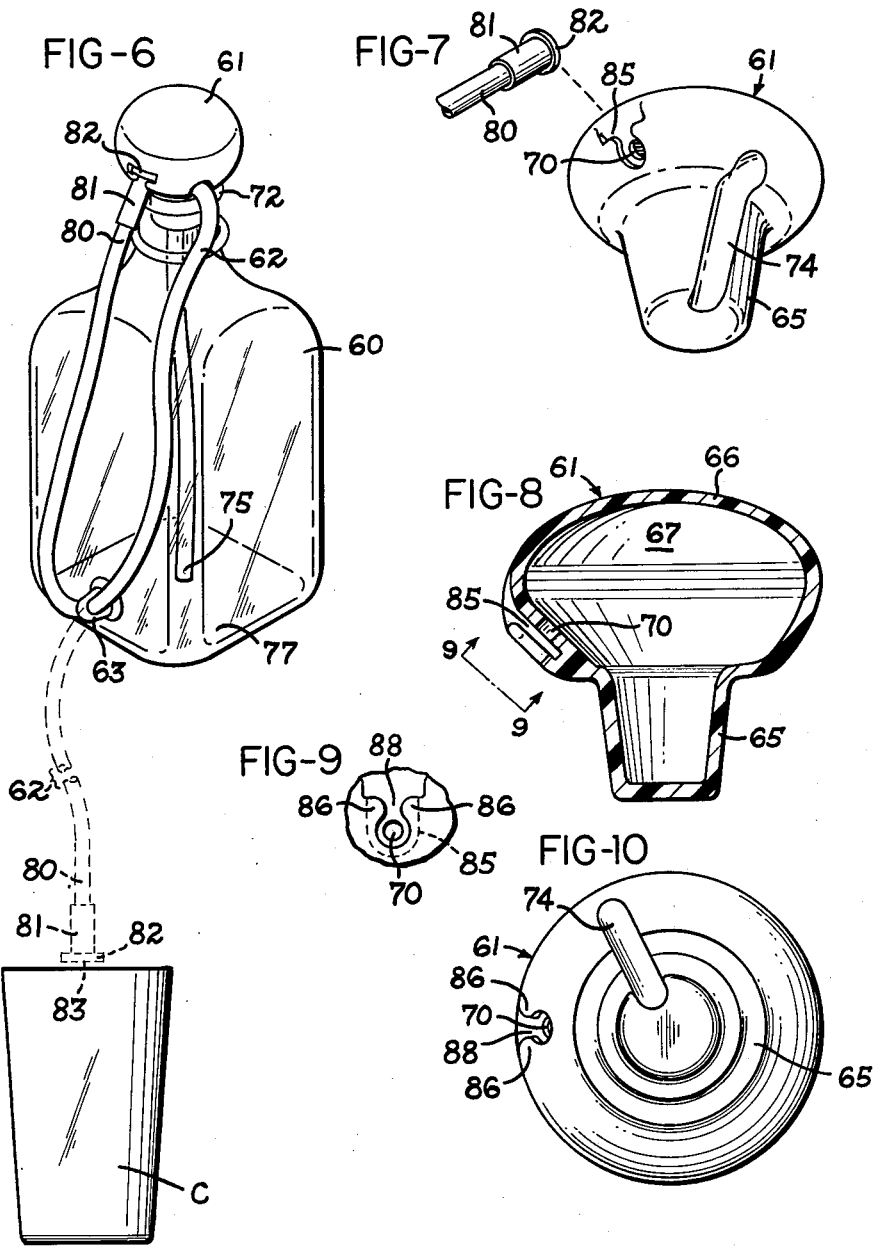
INVENTOR.
HAROLD E. POLLITT
BY
Marechal, Biebel, French & Bugg
ATTORNEYS United States Patent Office 3,160,330
Patented Dec. 8, 1964

3,160,330
DISPENSER
Harold E. Pollitt, 1414 Howell Road, Xenia, Ohio
Filed Mar. 26, 1963, Ser. No. 268,149
4 Claims. (Cl. 222—209)

The invention relates to liquid dispensing devices, and particularly to devices for removing contents of large milk bottles and the like without first lifting the bottle.

Large one gallon glass jugs have come into wide use in the retail distribution of milk, although this use is not without several very serious disadvantages. Not the least of these disadvantages is the difficulty encountered by children and many adults in attempting to handle the jug due to its weight when it is filled. Often these large jugs are dropped when the children attempt to remove them from the refrigerator with consequent injury to the child from both the falling object and the broken glass. Furthermore the milk is often spilled during the pouring operation especially when the jug is completely full.

Accordingly, an important object of this invention is to provide a liquid dispensing device which is easily adapted to large containers for removing the contents therefrom without lifting or otherwise moving the container, and particularly to provide such a dispensing device which is easily mounted on, stored with, and removed from milk containers of different sizes and configurations.

Another object of this invention is to provide apparatus for dispensing milk or the like from large one gallon glass jugs while located in a refrigerator, and further to provide the aforesaid apparatus with a manually actuated mechanism for initiating and controlling the quantity and rate of flow from the container.

A further object of this invention is to provide a dispensing device of the above character which can be easily cleaned and which meets sanitation requirements so that it can be used to dispense milk and other liquid foods without danger to health, and further to provide a dispensing device which is simple and durable in design and construction for long life and inexpensive manufacture.

Still further objects and advantages of the invention will be apparent from the following description the accompanying drawings and the appended claims.

In the drawings—

FIG. 1 is a perspective illustration of a refrigerator having therein a dispenser combination in accordance with the invention;

FIG. 2 is a perspective view of a large milk container or the like having the dispensing device mounted thereon;

FIG. 3 is a perspective view of the valve device utilized to control the flow from a container;

FIG. 4 is a vertical sectional view through the combination shown in FIG. 2;

FIG. 5 is an elevation view of the valve clamp in its open position;

FIG. 6 is a perspective view of another embodiment of the invention;

FIG. 7 is a perspective view of the cap for the embodiment shown in FIG. 6;

FIG. 8 is a vertical sectional view through the cap shown in FIG. 7;

FIG. 9 is a fragmentary view of the cap taken along the view line 9—9 of FIG. 8; and FIG. 10 is a bottom plan of the cap shown in FIG. 8.

Referring to the drawings wherein a preferred embodiment of the invention is shown, FIG. 1 illustrates a refrigerator 10 having a large gallon size glass milk jug 11 positioned on the upper shelf 13 thereof. The jug 11 has mounted thereon a dispenser 15 in accordance with the invention for obviating the requirement that the jug 11 be lifted in order to remove the milk therefrom, as will be described. The jug 11 has an upstanding neck 16 (see FIG. 4) on the upper portion thereof which defines the outlet opening 17 in the usual manner. A flexible carrying handle 18 is mounted around the neck 16 below the radially extending flange 21 and includes the annular portion 22 which surrounds the neck 16 and has the carrying handle 18 integrally secured to opposite sides thereof for movement between a horizontal storage position and a vertical carrying position.

The dispenser 15 includes a cap 24 adapted to be seated in the outlet opening 17, after the conventional stopper, not shown, has been removed therefrom. The cap 24 includes a frustoconical annular section 25 which is adapted to secure the cap 24 in outlet openings 17 of various sizes. Thus the cap can be adapted to any container having an outlet diameter ranging between the larger and smaller outer diameters of the frustoconical section 25.

A resilient elongated drainage tube 27 extends through an opening 28 in the side wall 29 of the cap 24 and its inner end 31 is positioned just above the bottom surface 32 of the jug 11. The portion of the tube 27 outside the jug 11 is secured to the outer wall of the jug, near the bottom thereof by a suction cup 33 which is secured in place by applying pressure thereto. This cup has an aperture 34 therethrough through which the tube 27 passes so that the tube 27 is held in position for facilitating storage and handling of the dispenser, and for aiding use of the dispenser when the jug 11 is positioned in a refrigerator, as shown in FIG. 1. The cup 33 holds the section of the tube 27 between the cap 24 and the cup 33 in place so that gravity will not cause any portion of the milk therein to flow into the jug 11, thus providing an automatic syphoning action once the outlet end of the tube 27 is lowered below the level of milk in the jug 11.

On the outermost end 36 of the tube 27 is mounted a collapsible resilient bulb 37 which can be manually compressed in order to force the fluid therein into the drainage tube for purposes to be described. The bulb 37 has an outlet tube 38 extending from the side thereof opposite the connection with the tube 27, and the valve clamp 40 is mounted on the tube 38 for controlling the flow of liquid therethrough.

The valve clamp 40 is constructed from a single elongated strip of spring steel which has been formed with a C-shaped clamp portion 42 having the lips 43 and 44 which are urged toward each other to compress the outlet tube 38 to block flow therethrough. The clamp portion 42 has the upper and lower actuator sections 45 and 46 integrally formed therewith for moving the lips 43 and 44 away from each other, and the lower section 46 has an upturned mounting flange 48 thereon. The clamp portion 43 has an aperture 51 therein aligned with the aperture 52 in the flange 48, and further aligned with the lips 43 and 44 so that the outlet tube 38 can be readily extended into the apertures 51 and 52 and between the lips 43 and 44 which pinch the tube 38 and block flow therethrough. The apertures 51 and 52 have diameters slightly smaller than the flexible outlet tube 38 so that, when the latter is inserted therethrough, the valve clamp 40 is held on the outlet tube 38 even when the lips 43 and 44 are moved apart to relieve the pressure on the tube 38.

In operation, after a jug 11 of milk or the like having a conventional handle 18 and cover, not shown, is purchased from one of the usual sources, the cover is removed and the cap 24 is inserted snugly in the opening 17 to provide a cover for the jug 11. The cap 24 preferably has the resilient drainage tube 27 extending therethrough when it is inserted in the outlet opening 17, and this tube is moved through the opening 28 in the cap until it is adjusted to a position slightly above the lower surface 32 of the jug 11. A slight clearance is provided between the tube and the cap so that air may flow therebetween, as will be described. As mentioned above, the cap 24 is easily adapted to outlet openings 17 of various sizes so that the dispenser 15 can be used with bottles or jugs having outlet openings within a preselected range of diameters.

The suction cup 33 is then secured to the outside wall of the jug 11 near the bottom thereof so that the tube 27 is held in position to facilitate handling and storage thereof. While the dispenser 15 is inactive, the actuator section 45 of the valve clamp 40 is hooked over the handle 18 so that the drainage tube 27, the bulb 37, the outlet tube 38, and the valve clamp 40 are neatly positioned on the glass jug 11. When it is desired to initiate operation of the dispenser 15, the valve clamp 40 is removed from the handle 18 and the bulb 37 is manually collapsed to expel air therein through the drainage tube 27 and into the jug 11. This air bubbles upwardly through the milk and outwardly of the jug 11 through the small clearance between the tube 27 and the cap 24. When the pressure on the bulb 37 is released, its resilience causes it to resume its original configuration thereby reducing the pressure in the tube 27 which in turn draws the milk or other liquid in the jug into this tube upwardly through the cap 24 toward the bulb 37. When enough air has been evacuated from the tube 27 so that the milk fills the tube from the inner end 31 to the portion in the cup 33, the dispenser 15 is ready for automatic operation.

When it is desired to dispense the milk into a smaller container, such as a common drinking glass or the like, the outlet tube 38 is placed directly above this small container and the actuator sections 45 and 46 moved manually to the position shown in FIG. 5 where the lips 43 and 44 no longer exert pressure on the tube 38 so that liquid will flow therethrough. The liquid flows readily from the jug 11 under the syphoning effect until the valve clamp 40 is released, at which time the clamp section 42 automatically returns the lips to their closed position, as shown in FIG. 4. The dispenser 15 can subsequently be utilized by merely opening the valve clamp 40 once again, since the milk remains in the drainage tube 27 until the jug 11 is emptied.

It is thus possible to completely remove the contents of a large milk jug or the like while mounted in the refrigerator without the necessity of lifting or otherwise moving the jug itself. Moreover, the dispenser is uniquely adapted for use with a gallon milk jug and it can be attached thereto, stored therewith and removed therefrom with a minimum of time and trouble. The valve clamp 40 is simple in design and is particularly adapted for use in the novel combination, although one skilled in the art will readily appreciate that such a clamp 40 can be utilized with other flexible tubes without departing from the scope of the invention. The entire combination and each component thereof is easily removed for cleaning by any conventional expedient, such as household detergents and there is a minimum of sharp corners and cracks wherein bacteria can collect and germinate.

Another object of this invention is illustrated in FIGS. 6-10, wherein the jug 60 has a dispenser secured thereon including the cap 61, the flexible tube 62, and the cup 63 which serves the same purpose and function as the cup 33 of the embodiment shown in FIGS. 1-5. The cap 61 includes a lower frustoconical section 65 and an upper collapsible section 66 both of which cooperate to define the chamber 67 having only the opening 70 to the atmosphere. The lower section 65 is similar to the section 25 of the cap 24, and similarly adapts the cap 61 to a predetermined range of neck sizes.

The tube 62 extends into the jug 60 between the cap 61 and the neck 72 of the jug 60, and the groove 74 prohibits the cap 61 from pinching the tube 62. Prior to placing the cap 61 in the neck 72, the inner end 75 of the tube 62 is adjusted so that it is positioned a short distance above the bottom surface 77 of the jug 60. The outlet end 80 of the tube 62 has a rigid mounting member 81 thereon with a radially outwardly extending flange 82 which surrounds the outlet opening 83. A complementary keyhole slot 85 is formed in the cap 61 in alignment with the opening 70 for receiving the flange 82, and the ear portions 86 define the neck 88 which has a width less than the outer diameter of the member 81, for locking the member 81 snugly to the cap so that the opening 70 in the cap 61 is in fluid tight connection with outlet 83 of the tube 62.

In operation, the tube 62 is inserted into a filled jug 60 and the end 75 spaced a short distance above the bottom surface 77 of the jug. The cap 61 is then placed in the neck 72 with the groove 74 providing slight clearance between the cap 61 and the tube 62. The cup 63 is then affixed near the bottom edge of the jug, and the member 81 is placed in the slot 85 with the outlet opening 83 aligned with opening 70 in the cap 61. In this position, the dispenser is in its carrying, storage, and operation initiating position. Thus to initiate operation thereof the resilient cap 61 is depressed or collapsed to force the air therein outwardly through the opening 70, into the tube 62, and into the jug 60. The chamber 67 has sufficient volume so that when it is released, it returns to its original shape thus drawing sufficient milk from the jug 60 into the portion of the tube 62 outside the jug 60 to initiate a syphoning action.

The dispenser is now ready for use by removing the member 81 from the slot 85 and placing the outlet 83 below the level of the milk in the jug 60 (see the broken line of FIG. 6), so that the syphoning action created by the liquid already in the tube 62 causes the milk to run into the cup C. When the desired amount of milk is placed in the cup C the member 81 is replaced in the slot 85, thus automatically terminating flow therefrom. The operation can be commenced again by merely lowering the member 81 below the level of the milk in the jug, until the latter is completely emptied. It should be appreciated that the cap 61 need only be depressed once to initiate operation and thereafter the dispenser operates automatically and the cap 61 serves the purpose of positioning the member 81 during handling and storage.

The caps 24 and 60, tubes 27, 38, and 62, and the bulb 37 are each constructed from a soft, resilient, and substantially inert material which can be easily cleaned and which does not deteriorate as a result of cleaning with detergents and hot liquids. These materials can be made transparent, translucent, or completely opaque without departing from the scope of the invention. A suitable material for these purposes, is vinyl chloride plastics, such as that sold under the trade name "Plastosol," although many other materials can be used so long as they substantially meet the requirements set forth above.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A dispensing device for removing liquid from a large milk jug or the like having a neck which defines an opening in the top thereof, comprising a hollow resilient cap adapted to engage the periphery of the opening for sealing the opening, an elongated flexible tube having one end which extends adjustably through the neck of the jug to near the bottom surface of the jug, said tube having a section outside said cap with an outlet in the end thereof, releasable means for holding the portion of said tube between said cap and said releasable means against the outside surface of the jug near the bottom thereof so that liquids in this portion of said tube will not flow under the force of gravity into the jug, means defining an opening in said hollow cap, means for connecting said outlet in said tube to said opening in said hollow cap for fluid tight seal between the interior of said cap and the interior of said tube to force fluids from said cap into said tube and into said jug when said cap is collapsed and to draw the liquids in said jug into said tube when said cap resumes its normal configuration to thus fill at least said portion of said tube with liquid to initiate a syphoning action when said outlet is lowered below the level of liquid in the jug.

2. A dispensing device for removing liquid from a large milk jug or the like having a neck which defines an opening in the top thereof, comprising a hollow resilient cap adapted to engage the periphery of the opening for substantially sealing the opening, an exterior groove in said cap, an elongated tube having one end which extends adjustably through said groove through the neck of the jug to a position near the bottom surface of the jug, said tube having a section outside said cap with a mounting member on the end thereof for defining an outlet, a radially outwardly extending flange on said member around said outlet, fastening means positioned on the jug near the bottom thereof for holding the portion of said tube between said cap and said fastening means against the outside surface of the jug so that liquids in this portion of said tube will not flow under the force of gravity into the jug, means defining an opening in said hollow cap, slot means in said cap for receiving said flame and locking said member said cap with said outlet connected to said opening for flow between the interior of said cap and the interior of said tube to force fluids from said cap into said tube and into said jug when said cap is collapsed and to draw the liquids from the jug into said tube when said cap resumes its normal configuration to fill at least said portion of tube to initiate a syphoning action when said outlet is lowered below the level of liquid in the jug.

3. A dispensing device for removing liquid from a large milk jug or the like having a neck which defines an opening in the top thereof, comprising a hollow resilient cap adapted to engage the periphery of the opening for substantially sealing the opening, an exterior groove in said cap, an elongated tube having one end which extends adjustably through said groove through the neck of the jug to a position near the bottom surface of the jug, said tube having a section outside said cap with a mounting member on the end thereof for defining an outlet, said member having a tubular portion with a radially outwardly extending flange around said outlet, fastening means positioned on the jug near the bottom thereof for holding the portion of said tube between said cap and said fastening means against the outside surface of the jug so that liquids in this portion of said tube will not flow under the force of gravity into the jug, means defining an opening in said hollow cap, means defining a slot in said cap having a cross-sectional configuration slightly smaller than said flange for receiving and snugly holding said flange, resilient locking ears at the entrance to said slot spaced apart a distance less than the outer diameter of said tubular portion of said member for locking said member in a storage position on said cap, said outlet being in fluid tight communication with said opening when in said storage position for flow between the interior of said cap and the interior of said tube to force fluids from said cap into said tube and into said jug when said cap is collapsed and to draw the liquids from the jug into said tube when said cap resumes its normal configuration to fill at least said portion of said tube for initiating a syphoning action when said outlet is lowered below the level of liquid in the jug.

4. A dispensing device for removing liquid from a large jug having an opening in the neck thereof and a carrying handle around the neck, comprising a resilient plug-type cap having frustoconical sides adapted to engage the jug adjacent the periphery of the opening for sealing the opening, an elongated flexible tube having one end which extends adjustably through an aperture in said cap to near the bottom surface of the jug, said tube having a section outside said cap, a resilient fluid-tight bulb on the open end of said outside portion of said tube for initiating the flow of fluids through said tube, suction cup securing means releasably mounted on the outside surface of said jug near the bottom thereof for holding the portion of said tube between said cap and said bulb against the outside surface of the jug near the bottom thereof so that liquids in this portion of said tube will not flow into the jug under the force of gravity, an outlet tube connected to said bulb in communication with the interior thereof, a normally closed valve on said outlet tube for controlling the flow of liquid therethrough, said valve including a single strip of spring metal having a C-shaped clamp portion which terminates in a pair of lips, said lips being urged toward contact with each other by the C-shaped portion, an actuator section integral with each of said lips and extending rearwardly adjacent said C-shaped portion and then extending outwardly from said C-shaped portion opposite said lips to provide spaced manually operable actuator levers for moving said lips to an open position wherein they are spaced from each other, an inturned flange on one of said actuator levers opposite the C-shaped portion having an aperture of predetermined diameter therein, means defining a second aperture of said predetermined diameter in said C-shaped portion opposite said lips and between said actuator sections, said first and second apertures being axially aligned with the space between said lips to position and hold said tube at all times between said lips, said outlet tube having an outer diameter slightly less than said predetermined diameter and extending through both said apertures and between said lips for holding said valve on said outlet tube and for sealing said outlet tube until said lips are moved to said open position by movement of said actuator levers, said actuator sections being spaced apart sufficient distance so that the other of said actuator can be hooked onto the carrying handle to provide a storage position for said bulb, tube, and valve adjacent the neck of the jug.

References Cited by the Examiner
UNITED STATES PATENTS

| | | | |
|---|---|---|---|
| 208,592 | 10/78 | Handy | 222—527 X |
| 682,269 | 9/01 | Poe | 137—150 X |
| 2,218,941 | 10/40 | Thompson | 137—150 X |
| 3,078,017 | 2/63 | Waskonig et al. | 222—181 |

FOREIGN PATENTS 200,949   12/58   Austria.

LOUIS J. DEMBO, *Primary Examiner.*